United States Patent [19]
Kehl et al.

[11] 4,158,718
[45] Jun. 19, 1979

[54] FREELY SUSPENDABLE LIGHT-TRANSPARENT HEAT BARRIER FOR WINDOW

[75] Inventors: Albin Kehl; Friedrich Scharf, both of Stuttgart, Fed. Rep. of Germany

[73] Assignee: Robert Bosch GmbH, Stuttgart, Fed. Rep. of Germany

[21] Appl. No.: 869,450

[22] Filed: Jan. 16, 1978

[30] Foreign Application Priority Data

Jan. 29, 1977 [DE] Fed. Rep. of Germany ....... 2703688

[51] Int. Cl.$^2$ ..................... B32B 15/08; B32B 27/32; E04B 1/62
[52] U.S. Cl. .................... 428/461; 428/523; 428/913; 428/918; 428/920
[58] Field of Search ............... 428/920, 921, 913, 918, 428/458, 461, 523

[56] References Cited

U.S. PATENT DOCUMENTS

| | | | |
|---|---|---|---|
| 1,977,639 | 10/1934 | Langdon | 428/920 X |
| 3,039,904 | 6/1962 | Stage | 428/920 X |
| 3,138,517 | 6/1964 | Charbonneau | 428/920 X |
| 3,152,950 | 10/1964 | Palmquist et al. | 428/458 X |
| 3,166,800 | 1/1965 | Zoldok | 428/920 X |
| 3,776,805 | 12/1973 | Hansen | 428/913 X |
| 4,095,013 | 6/1978 | Burger | 428/918 X |

*Primary Examiner*—Harold Ansher
*Attorney, Agent, or Firm*—Frishauf, Holtz, Goodman & Woodward

[57] ABSTRACT

A multi-layer flexible sheet is provided for hanging freely on the interior room side of a window, or the like, that reflects radiant heat from inside the room back into the room with high effective reflectivity, transmits light from the window into the room adequately for looking out, is easily rolled up when not needed, and, furthermore, can be used in summer to reflect out undesired heat and glare from incident sunlight without undue loss of transparency for looking out. A synthetic resin layer of polyethylene or polypropylene having a thickness not exceeding 0.1 mm is on the room side of the laminate and has a metallic film on its outward-facing surface of gold or aluminum that does not need to be of high uniformity in thickness. A cover layer of transparent synthetic resin on the side facing the window protects the metallic film from mechanical damage and is of strength and thickness sufficient to supply any additional necessary mechanical stability.

21 Claims, 3 Drawing Figures

FREELY SUSPENDABLE LIGHT-TRANSPARENT HEAT BARRIER FOR WINDOW

This invention concerns a heat-loss barrier for use with conventional windows or transparent panels of doors, window-walls, and the like, forming part of the enclosure of a heated room or corridor of a building. More particularly it relates to the provision of a flexible film formed in several distinct layers that can be dispensed from a roller, utilizing a synthetic resin layer as surface protection and a metal film such as can be vapor deposited on a synthetic layer, on one side, that is partly transparent in the visibile light region, with at least one transparent cover layer on the metal film side of the first mentioned synthetic resin layer.

BACKGROUND AND PRIOR ART

The so-called sunshade films or reflection films that are applied for protection against sunlight on single-glazed windows on the inside glass surface and are likewise provided on the inner side of the outer pane of bonded double glazing or the inside of the outer pane of spaced insulating double glazing, in each case by means of an adhesive, are known protective barriers of the general type described above. Such reflecting films use a partly transparent polyester film as the synthetic resin layer that carries on one side a vapor deposit metal film, as a rule of aluminum. The metal film is covered by a cover layer on the side of it facing away from the polyester film, the cover layer as a rule consisting of another polyester film. Both polyester films in addition to functioning as supporting carriers, provide protection against corrosion and scratching up of the metal film. Such sunlight protection films affixed to glass panes or panels by adhesive are intended to reduce the radiation to the room of heat rays, glare and ultraviolet rays of the sun.

The sunlight-protection films, on the other hand, are not suited to reduce the passage of heat in the opposite direction, i.e. from the room space out to the exterior. This is to be explained by the high absorptivity of the synthetic resin layer, in the form of a polyester film, which is provided on the room side of the material. This polyester film warms up under the influence of heat radiation of any source of heat located in the room. As the result of heat conduction, this heat is transmitted through the metal film to the cover layer, which is another polyester film and from there it is radiated away without undergoing any reflection by the metal film. Only a small part of the secondary heat radiation produced by heating up of the material is regained by radiation back into the room space, because it is transmitted back only according to the comparison of the transition resistances on the room side and the external side. In consequence, such known reflection films are limited to the sunlight protection service alone and make possible practically no appreciable heat loss protection of the room space against the exterior. There is a further disadvantage that the vapor deposited metal film must be unusually uniform, which naturally raises the costs involved in the production of the material to a high level. Such sunlight protection films are therefore of rather high price. Their application by use of an adhesive requires about twice their price per square meter, and furthermore, must be performed exclusively by specialized craftsmen.

There is also known a kind of double glazing in which the inner surface of the outer pane has a thin vapor deposited gold film. The inner pane provides a relatively good protection of the metal film against the mechanical damage. The metal film is partly transparent in the visible light spectral region, with a color-changing effect, but reflects at the same time large proportions of the incident sunlight and thus offers a very good protection against sunlight. Furthermore, the metal film also reflects the largest portion of the long wave infrared radiation from the room space and thus reduces the heat transmissivity. The vapor deposited gold filmed double glazing is used predominantly as a sunlight protection measure in the construction of office buildings. It has the disadvantage that its price per square meter is above five times that of the just described sunlight protection films to be applied by adhesion to the window surfaces. Therefore, for economic reasons, the installation of gold-filmed insulating windows is considered for only a limited range of uses, thus in no case in the field of private dwellings or public buildings.

THE PRESENT INVENTION

It is an object of the present invention to provide a heat-loss barrier for a light-admitting panel capable of providing both protection against loss of heat by radiating out of the room through the transparent panel and also protection against sunlight shining into the room, thus reducing the heat transfer coefficient and the heat losses from the interior and providing saving of heating energy in winter and also providing a transparent protection against sunshine in summer without requiring expensive double windows, insulating double glazing or very expensive gold-filmed double glazing. It is another object of the invention to provide such a heat-loss barrier at low cost in a retractable form similar to that of a roll-up shade, curtain or the like that can easily be utilized and even installed by persons without special training.

Briefly, the synthetic resin layer on the room side of the barrier is made as thin as possible, preferably less than 0.1mm thick, and consists of a material with the lowest possible absorptivity in the infra-red spectral region preferably polyethylene or polypropylene. The metal film consists of a material with a high reflectivity in the infra-red spectral region and on the other hand, a high transmissivity in the visible light range, preferably vapor deposited gold, aluminum, copper, silver, nickel or zinc, preferably in a vapor deposition layer thinner than 300Å. In the case of gold a thickness between 200Å and 300Å is preferred and in the case of aluminum, 50Å to 100Å. The absorptivity in the infra-red region is preferably less than 40% and the reflectivity in the infra-red region for radiation from the room side preferably at least 80%, while the transmissivity in the visible light-range is preferably at least 25%. In the case of a gold film it is advantageously possible to obtain infra-red reflectivity greater than 90% and visible light transmissivity of about 30%. In the case of aluminum it is advantageously possible to obtain infra-red reflectivity of about 80% with visible light transmissivity of about 25%. The protective cover layer on the other side of the metal film is preferably also of synthetic resin material maybe provided either as a varnish film or as a transparent synthetic resin sheet joined to the metal film side of the other synthetic resin layer by means of an adhesive. In either of these cases, the cover layer just mentioned lends some mechanical stability to the laminated product and in the latter case, a separately made film joined with an adhesive, can be of any convenient thickness and transparent material.

The metal film, advantageously, does not need to be of a high degree of uniformity, since the occupants of the room can easily accomodate themselves to small variations in transparency. This greatly reduces the costs of the vapor deposition of the metal film. The synthetic resin layer on the room side has the advantage provided by its very samll thickness and its very low absorptivity in the infra-red spectral range. The results is that this synthetic resin layer is warmed only to an extraordinarily small degree by radiant heat from the room interior and hardly any proportion of the long wave infra-red radiation goes out to the exterior as a loss instead of being reflected by the metal film. An extraordinarily large proportion of the long wave infra-red radiation from the room interior, conversely, is reflected back into the room interior by the metal film. The heat loss barrier of the inventon is used by freely hanging it spaced from the light admitting panel instead of being joined by an adhesive to the window pane, resulting in a better protection against heat loss escaping from the room interior, thus providing a considerable saving in heat energy. Shorter heating-up times are made possible for the room. A single glazed window with a suspended heat-loss barrier according to the invention on the room side can reach values of effectiveness in preventing heat loss that are close to those which only double glazed windows could previously achieve. The heat transfer coefficients of windows are reduced by about 35%. In summer the highly effective sunshine protection is provided by the same means, for in that case the suspended barrier of the present invention can screen off about 60% of the solar energy incident on the pane, while still providing a transparency of, for example, about 30%.

Of particular advantage is the relatively low production price of the device of the invention and the accompanying convenience of retractability by which at any time the device can be rolled up or drawn off to one side after the fashion of a shade or rolling shutter or of a curtain or drape, easily performed by the ordinary person. By reason of the low cost per square meter, the provision of heat-loss barriers according to the invention on the room side of single glazed windows and the like, can pay for itself by amortization of the installation price over a few years by the savings in heating costs alone, with the result that the protection against the effects of sunshine can be treated as a free bonus for the user, without substantial sacrifice of transparency. For protection against sunshine alone one would otherwise have additional costs for shades or blinds that in most cases would have the disadvantage of blocking vision through the window when in use.

The protective barrier according to the invention is situated loosely in front of the window on the room side and its free suspension contributes to the reduction of the heat-losses that would otherwise be produced by infra-red absorption and heat conduction. In the case of double glazing, it is possible to utilize the heat-loss barrier of the invention in space between the panes or on the room side in front of the double glazed window.

DRAWINGS, ILLUSTRATING EMBODIMENTS

The invention is further described by way of example with reference to the accompanying drawings, in which.

DESCRIPTION OF THE ILLUSTRATED EMBODIMENTS

Figure 1:
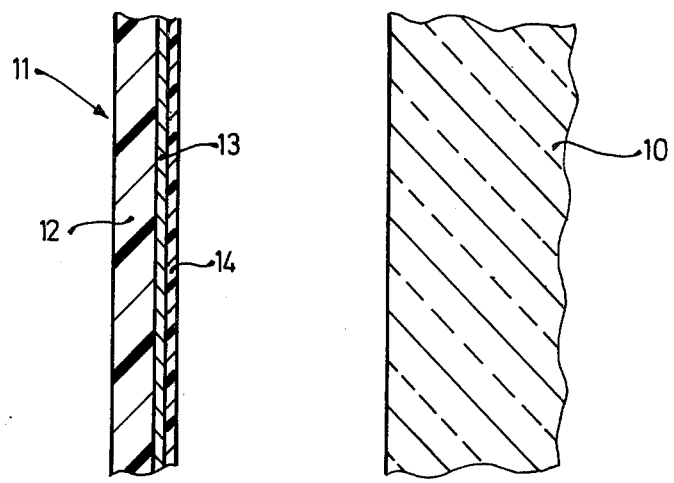
FIG. 1 is a diagrammatic vertical cross-section of a single glazed window pane with a heat-loss barrier constituting a first embodiment of the invention loosely suspended on the room side of the pane, i.e. to the left.

FIG. 1, which illustrates a first embodiment of the invention, shows a single glazed window glass pane 10 that provides a light admitting panel (e.g. a window) forming part of a room, which is assumed to be at the left, and which is closed off from an exterior, that is assumed to be at the right of the window pane 10. The full thickness of the pane 10 is not shown in the diagram. In the room interior, to the left of the pane 10 in FIG. 1, there is provided a multi-layer sheet or film web 11 constituting a protective device for the pane 10, protecting it against excessive heat transfer between the heat source located in the room interior out through the pane 10. The multi-layer web 11 is essentially flexible. In particular it consists of the following components: first, a thin at least partly transparent synthetic resin layer 12 operating as surface protection; second, a thin metal film 13 applied to the synthetic resin layer 12 by vapor deposition on its side which is at the right in FIG. 1 and, third, transparent cover layer 14 on the other side of the metal film 13, at the right of it in FIG. 1, thus on the side of the metal film which faces away from the synthetic resin layer 12.

The synthetic resin layer 12 is made as thin as possible and consists of a material with an absorptivity in the infra-red spectral region which is as low as possible.

The metal film 13 consists of a material that on the one hand has high reflectivity in the infra-red spectral region and, on the other hand, has high transmissivity in the visible light spectral region.

The cover layer 14 consists of a synthetic material and serves, on the one hand as a protective layer to protect the metal film 13 against soiling, corrosion and mechanical damage (such as scratching up or the like) and, on the other hand, as a stabilizer that lends mechanical toughness to the laminated web 11.

The combined laminated web 11 hangs freely and loosely at some spacing from the pane 10, suspended somewhat after the fashion of a window shade, a curtain or the like. It is of particular significance that the suspension should be provided in such a way that the thin synthetic resin layer 12 is on the room side, i.e., to the left in FIG. 1, and that the cover layer 14 is on the side away from the room, i.e. to the right in FIG. 1.

The synthetic resin layer 12 consists essentially of a thin web of polyethylene or polypropylene, but it can also be provided, for an embodiment of a kind not illustrated in the drawings, by applying a synthetic resin varnish coat. The synthetic resin layer 12 is extraordinarily thin. Its thickness in the illustrated case is at most 0.1mm. It has an absorptivity in the infra-red spectral region that is smaller than 40%, and is typically between 40% and 20% and can advantageously be still smaller.

The metal film 13 in the illustrated case consists of vapor deposited gold and has a layer thickness in the range between 200Å and 300Å. Its reflectivity in the infra-red spectral region is greater than 90% and its teranmissivity in the visible light spectral region is in the order of magnitude of 30%.

In another embodiment, not specifically shown, the metal film 13 is of aluminum, preferably with a layer thickness in the region between 50 Å to 100 Å, in which case the reflectivity in the infra-red spectral region is of the order of magnitude of 80% and its transmissivity in the visible light region is of the order of about 25%. In still other embodiments, likewise not specifically illustrated, the metal film, instead of being provided as just mentioned, consists of copper or silver, nickel or zinc.

The cover layer 14 in the first illustrative embodiment shown in FIG. 1 consists of synthetic material, in this case a transparent protective varnish coating of which the thickness and material is in no way critical subject to wide variation according to what qualities of mechanical toughness are required of the multi-layered web 11.

Figure 2:
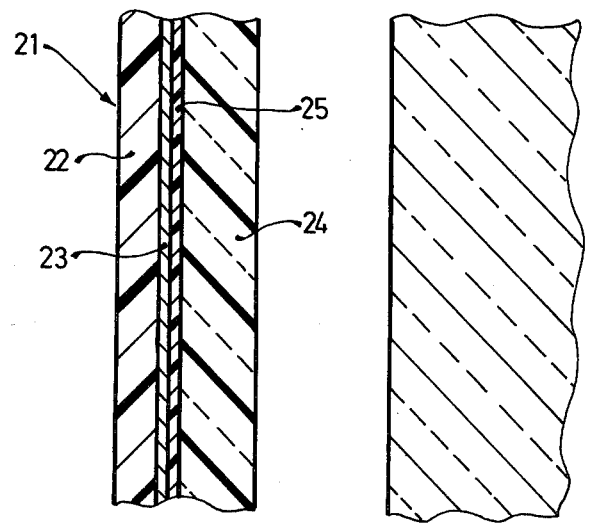
FIG. 2 is a cross-section corresponding to FIG. 1 illustrating a second embodiment of the invention.

FIG. 2 shows a second illustrative embodiment of the invention that differs from the first merely in that cover layer 24, 25 consists of a transparent synthetic resin sheet or web 24, for example made of polyethylene film, that is joined to the right-hand side of the metal film 23 of FIG. 2 by means of an adhesive 25 and fulfills the same carrier and protector functions that the cover layer 14 of FIG. 1 fulfills. The heat transmitting protective synthetic resin layer 22 on the left hand side of the metal film 23 in FIG. 2, corresponds in all respects with the layer 12 of the first illustrative embodiment shown in FIG. 1.

The synthetic resin layer 12 of FIG. 1 and the corresponding layer 22 of FIG. 2 serve solely for the mechanical protection and support of the metal film 13 in the case of FIG. 1 and 23 in the case of FIG. 2, and as already explained, this web is made as thin as possible of material having the lowest possible absorptivity for infra-red radiation.

Figure 3:
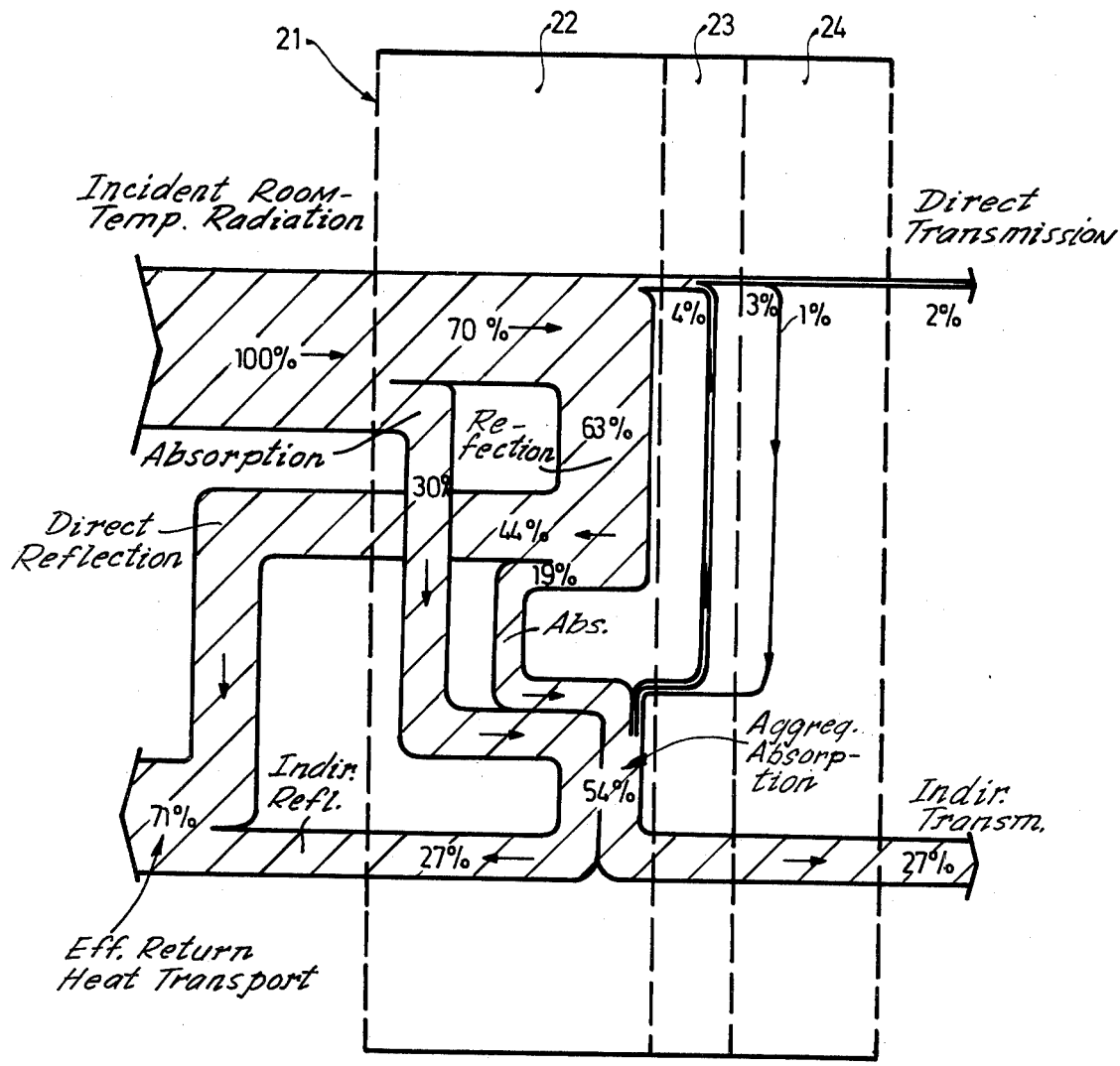
FIG. 3 is a graphical flow diagram illustrating the energy balance involving reflection, absorption and transmission, referring to the second embodiment illustrated in FIG. 2.

The diagram given in FIG. 3 shows the energy balance for a multi-layer laminated web 21 according to the second illustrative embodiment which is the subject of FIG. 2 and refers to room temperature radiation, without convection. For the synthetic resin layer 22 in the form of a polyethylene film an absorption capability (absorptivity) of 30% is assumed for the purpose of the example and an absorptivity of the same magnitude is also assumed for the cover layer 24, which likewise is in the form of a polyethylene film, this absorptivity in the range typical for the material.

For the metal film the reflectivity in the infra-red spectral region is taken to be 90%, the transmissivity as 5% and, finally the absorptivity as likewise 5%.

As FIG. 3 shows, in spite of the synthetic resin layer 22 on the left side of the metal film 23 an effective reflectivity of the structure of about 70% can still be obtained.

In comparison to what has just been set forth, if the same multi-layer were joined to the room side of the outer pane in the known way with adhesive, an effective reflectivity of only about 55% would be obtained, which shows thus the substantially poorer thermal effectiveness obtained by bonding of the film to a window pane with an adhesive.

When a value for the effective reflectivity of the multi-layer sheet material has been ascertained, the heat transfer coefficients sometimes designated as k-values of various window-laminate combinations can be calculated.

The effective reflectivity is calculable according to the diagram of FIG. 3 as follows:

$$R_{eff}=(1-A)^2 \cdot R + C[A+(1-A) \cdot RA + (1-A)A_F + (1-A) \cdot T_F A],$$

in which:

A = absorptivity of the synthetic layer 22 and of cover layer 24;
R = reflectivity of the metal film 23;
$T_F$ = transmissivity of the metal film 23;
$A_F$ = absorptivity of the metal film 23;
C = distribution factor that specifies how much of the absorbed heat goes off to the right and how much to left, by way of radiation and convection, and
$R_{eff}$ = effective reflectivity of the laminated web 21.

In the above calculation, the values of A, R, $T_F$, $A_F$ refer to radiation at a 20° C. room temperature.

If the mutli-layer sheet or film 21 hangs loosely on the room side in front of the windowpane, convection and radiation resistances on the two sides of the multi-layer webb are approximately of equal size, so that the following relation approximately holds:

$$C=0.5.$$

If the multi-layer sheet, on the other hand, were affixed with an adhesive to the room side of the outer pane, C would then, as a result of the substantially stronger convection at the outer surfaces, be smaller, ($C \approx 0.2 \ldots 0.3$).

In the case of a polyethylene film 0.1mm thick the absorptivity A lies in the range of 0.2 to 0.4, with some uncertainity as a result of imperfect or incomplete infrared spectra. If a reflectivity of the metal film 23 of R=0.9, which is quite possible to obtain, is assumed, the following effective reflectivities of the multi-layer sheet material result for the different conditions of use:

$R_{eff} \approx 0.70$ in the case of freely suspended curtain or roll up shade, and $R_{eff} \approx 0.55$ in the case of adhesion by adhesive affixation to windowpane.

Variation in mechanical requirements is taken care of by variation of the thickness properties (other than transparency) of the cover layer that is on the exterior side (away from the room interior) the multi-layer film. There is a wider choice available for the material of this cover layer than for the synthetic resin layer on the room side. The cover layer material and thickness can be chosen with regard to the mechanical loading resulting from the length of the curtain provided and/or exposure to other mechanical forces such as rubbing against drapes, frequent rolling up and letting down, etc. As already mentioned, if only light mechanical loading is involved, the cover layer 14, 24 can be provided by applying a transparent varnish coat, as in FIG. 1, rather than by joining another synthetic resin film to the one that carries the metal layer by means of an adhesive.

We claim:

1. A substantially light-transparent heat-loss barrier for a light-transmitting and convection-opposing panel, such as a window, forming part of the enclosure of a heated space, said heat-loss barrier comprising a flexible and retractable curtain of laminated composite sheet material suspended loosely and freely on the heated-space side of said panel and spaced therefrom, and capable of being rolled up, said curtain consisting essentially of:
  a thin, transparent flexible layer (12; 22) of synthetic resin material having the least possible absorption (A) in the infra-red spectral region, said layer being on the side of said curtain facing towards the inward portion of said heated space;
  a thin vapor deposited metal film on the side of said synthetic resin layer facing away from said heated space, said metal film having a high reflectivity (R) in the infra-red spectral region and a high transmissivity (T$_F$) in the visible light spectral region, and
  a transparent flexible cover layer (14;24, 25) on the side of said metal film away from said synthetic resin layer for protection of said metal layer from soiling, corrosion and scratching and other mechanical damage and for lending some mechanical stability to said curtain;
  said flexible layers being so thin, for the material used, that the composite sheet material formed therewith is capable of being rolled up from suspension for retraction of said curtain.

2. A heat-loss barrier for a light-emitting panel as defined in claim 1 in which said synthetic resin layer (12; 22) has a maximum thickness of 0.1mm.

3. A heat-loss barrier for a light-emitting panel as defined in claim 2 in which said synthetic resin layer (12; 22) is constituted as a preformed film of said synthetic resin material.

4. A heat-loss barrier for a light-emitting panel as defined in claim 3 in which said synthetic resin layer (12; 22) consists essentially of a polymer selected from the group consisting of polyethylene and polypropylene.

5. A heat-loss barrier for a light-emitting panel as defined in claim 4 in which said metal film (13; 23) is a transmissivity (T$_F$) in the visible light spectral region of at least 25%.

6. A heat-loss barrier for a light-emitting panel as defined in claim 5 in which said metal film (13; 23) has a film thickness that is less than 300Å.

7. A heat-loss barrier for a light-emitting panel as defined in claim 5 in which said metal film (13; 23) is a film of gold.

8. A heat-loss barrier for light-emitting panel as defined in claim 7 in which said gold film (13; 23) has a thickness in the range between 200Å and 300Å.

9. A heat-loss barrier for a light-emitting panel as defined in claim 8 in which said gold metal film (13; 23) has a reflectivity (R) in the infra-red region that is greater than 90% and has a transmissivity (T$_f$) in the visible light region of the order of about 30%.

10. A heat-loss barrier for a light-emitting panel as defined in claim 5 in which said metal film (13; 23) is a film of aluminum.

11. A heat-loss barrier for a light-emitting panel as defined in claim 10 in which said aluminum metal film (13; 23) has a film thickness in the range between 50Å and 100Å.

12. A heat-loss barrier for a light-emitting panel as defined in claim 11, in which said aluminum metal film (13; 23) has a reflectivity (R) in the infra-red spectral region of the order of magnitude of about 80% and has a transmissivity (T$_F$) in the visible light spectral region of the order of magnitude of about 25%.

13. A heat-loss barrier for a light-emitting panel as defined in claim 5, in which said metal film (13; 23) is a film of a metal selected from the group consisting of copper, silver, nickel or zinc.

14. A heat-loss barrier for a light-emitting panel as defined in claim 2, in which said cover layer (14; 24) is of synthetic resin material.

15. A heat-loss barrier for a light-emitting panel as defined in claim 14, in which said cover layer is constituted as a transparent varnish coating (14).

16. A heat-loss barrier for a light-emitting panel as defined in claim 14, in which said cover layer is a transparent web (24) of synthetic resin material adhering to the metal film side of said first mentioned synthetic resin layer by virtue of the presence of an adhesive 25.

17. A heat-loss barrier for a light-emitting panel as defined in claim 16, in which the thickness of said cover layer is substantially greater than the thickness of said first mentioned synthetic resin layer having said metal film on one side thereof.

18. A heat-loss barrier for a light-emitting panel as defined in claim 1 in which said metal film (13; 23) has a reflectivity (R) in the infra-red spectral region with respect to heat radiation from the inner portion of said heated space which exceeds 80%.

19. A heat-loss barrier for a light-emitting panel as defined in claim 18 in which said metal film (13; 23) is a transmissivity (T$_F$) in the visible light spectral region of at least 30%.

20. A heat-loss barrier for a light-emitting panel as defined in claim 1 in which the absorptivity (A) of said synthetic resin layer (12; 22) in the infra-red region does not exceed 40%.

21. A heat-loss barrier for a light-emitting panel as defined in claim 20 in which said absorptivity (A) of said synthetic resin layer (12; 22) is within the range between 20% and 40%.

* * * * *

UNITED STATES PATENT AND TRADEMARK OFFICE
CERTIFICATE OF CORRECTION

PATENT NO. : 4,158,718
DATED : June 19, 1979
INVENTOR(S) : ALBIN KEHL et al

It is certified that error appears in the above-identified patent and that said Letters Patent are hereby corrected as shown below:

In claim 8:

Column 7, line 50, before "thickness" the word --film-- should be inserted.

Signed and Sealed this

Thirtieth Day of October 1979

[SEAL]

Attest:

RUTH C. MASON
Attesting Officer

LUTRELLE F. PARKER
Acting Commissioner of Patents and Trademarks